Patented Dec. 20, 1932

1,891,455

UNITED STATES PATENT OFFICE

FRITZ SEEBACH, OF ERKNER NEAR BERLIN, GERMANY, ASSIGNOR TO BAKELITE GESELLSCHAFT MIT BESCHRANKTER HAFTUNG, OF BERLIN-CHARLOTTENBURG, GERMANY

PROCESS FOR PURIFYING PHENOL-ALDEHYDE CONDENSATION PRODUCTS

No Drawing. Application filed May 3, 1929, Serial No. 360,325, and in Germany May 5, 1928.

The principal impurities in resinous condensation products from phenols and aldehydes are uncombined phenols and by-products. These impurities can be only partly removed by distillation of the condensation products. In the distillation of the reactive phenolic resins it is necessary not to exceed a certain temperature in order to avoid the hardening of the resins. However, the nonreactive phenolic resins also cannot be purified completely by distillation from the uncombined phenols and the by-products.

I have found that on using suitable fluxing materials in the distillation the free phenols and by-products may be completely removed from the phenolic resins. The fluxing materials used for such purpose may be high boiling organic substances dissolving the phenol-aldehyde resin to be purified at ordinary or at a higher temperature or high boiling organic substances which are soluble in the phenol resins and are themselves able to dissolve such resins. High boiling organic substances which at elevated temperatures form homogeneous mixtures with the resins may also be used. High boiling organic substances containing hydroxyl groups such as high boiling alcohols, high boiling phenols or their esters have proved to be particularly suited for the present process. Whether the flux used combines chemically with the condensation product, is not essential. Apparently such fluxing materials are chemically entirely indifferent to the phenol-aldehyde resin and only act as flux. For instance the following substances will serve as suitable flux: glycerine, ethylene glycol, phthalic acid, lactic acid, ester of phthalic acid, ester of lactic acid, $\alpha$- or $\beta$-naphthalene chloride, dichloronaphthalene, tetrahydronaphthalene, decahydronaphthalene, hexahydrophenol or its esters. Furthermore as fluxing materials substances may be used which are not of alcoholic or phenolic nature, but may be so in a tautomeric modification such as urea and thiourea. The quantity of the flux may differ largely and depends on the quantity and the nature of the impurities to be removed as well as on the nature and the properties desired of the condensation products to be manufactured. The distillation may be carried out in a suitable manner, for instance at ordinary or reduced pressure, or in a current of gas or vapour, for instance by conducting through the molten mass a heated current of inert gas or vapour. The distillation temperature depends on the nature and the quantities of the condensation product and the flux used. The flux may be removed from the resins by distillation. However, it may also remain wholly or partly in the condensation products. The flux removed from the condensation product by distillation may be used again for carrying out my process after separating the phenols and by-products contained therein according to known methods. The flux may be added to the ready condensed resins or to the mixture of phenols and aldehydes during the manufacture of the condensation products.

Example 1

A mixture of 2120 parts by weight of phenol-formaldehyde condensation product (novolak), 280 parts by weight of glycerine is subjected to distillation in the vacuum. The quantity of the distillate amounts to 306 parts. The residue which when cold is similar to crown glass, almost colourless, of conchoidal fracture, has a good flowing capacity and is free from uncombined phenols, water and contact substances. It does not contain substances binding bromine which may be removed by means of aqueous vapours, and its ether-extract does not react on ferric chloride. It is therefore also free from any phenols which are not distillable with steam and for this reason may not be ascertained by absorption of bromine.

Example 2

2200 parts by weight of technical phenol, 1400 parts by weight of formaldehyde of 40%, 20 parts by weight of hydrochloric acid of 8%, 264 parts by weight of glycerine are condensed. As soon as the main reaction is completed the uncombined phenol is distilled under vacuum at 160–170° C. The residue is an artificial resin, completely free from free phenols and by-products.

Example 3

A mixture of 2100 parts by weight of a fusible phenol-aldehyde condensation product (novolak), 250 parts by weight of ethylene glycol is distilled under vacuum at 175° C. The residual resin is completely free from uncombined phenols and by-products. It may easily be pulverized and hardens quickly by means of the usual hardening agents.

Example 4

A mixture of 212 parts by weight of a fusible phenol-aldehyde condensation product (novolak), 56 parts by weight of glycerine is distilled under vacuum to 170–180° C. until a resin is obtained which is completely free from uncombined phenols and by-products.

Example 5

A mixture of 210 parts by weight of a fusible phenol-aldehyde condensation product (novolak), 84 parts by weight of glycerine is distilled under vacuum to 170–180° C. The product obtained is completely free from phenol and by-products.

Example 6

A mixture of 300 parts by weight of a fusible phenol-aldehyde condensation product (novolak), 40 parts by weight of hexahydrophenol is distilled to 140–150° C. under vacuum until the free phenols and the by-products are removed. A considerable amount of hexahydrophenol is distilled simultaneously. The hexahydrophenol may be separated from the distillate by means of alkali-lye or fractional distillation.

My invention is, of course, not restricted to the above described quantities and methods of operation but broadly relates to the purification of phenol-aldehyde resins, particularly to those of the fusible non-reactive type (novolak) by means of distillation with high boiling organic fluxing materials. The term "fluxing material" refers to high boiling organic substances dissolving the resin to be purified at ordinary or at a higher temperature or high boiling organic substances which are soluble in the phenolic resins and are themselves able to dissolve such resins or high boiling organic substances which in the heat together with the resins form homogeneous masses. The term "phenol" refers to carbolic acid as well as to its homologues and the term "aldehyde" refers to formaldehyde as well as to the homologous and polymeric aldehydes, for instance acetaldehyde, trioxymethylene and other similar aldehydes, such as furfurol or substances containing aldehyde groups, for instance hexamethylene tetramine. My process may be furthermore carried out with several high boiling organic fluxing materials mixed with one another.

I claim:

1. Process for completely purifying permanently fusible non-reactive phenolaldehyde resins with respect to uncombined phenol comprising the distillation of said phenolic resins at a temperature of at least 140° C. in presence of high boiling non-resinous organic fluxing compounds.

2. Process for completely purifying permanently fusible non-reactive phenolaldehyde resins with respect to uncombined phenol comprising the mixing of the said resins with high boiling non-resinous organic fluxing compounds and distilling the mixture at a temperature of at least 140° C. until the uncombined phenols and the by-products are removed.

3. Process for completely purifying permanently fusible non-reactive phenolaldehyde resins with respect to uncombined phenol comprising the distillation of said resins at a temperature of at least 140° C. in presence of high boiling non-resinous organic compounds containing hydroxyl groups.

4. Process for completely purifying permanently fusible non-reactive phenolaldehyde resins with respect to uncombined phenol comprising the distillation of said resins at a temperature of at least 140° C. in presence of glycerine.

5. Process for completely purifying permanently fusible non-reactive phenolaldehyde resins with respect to uncombined phenol comprising the distillation of said phenolic resins at a temperature of at least 140° C. in presence of high boiling non resinous organic fluxing compounds under reduced pressure.

In testimony whereof I affix my signature.

FRITZ SEEBACH.